United States Patent Office 3,321,313
Patented May 23, 1967

3,321,313
OXAZOLIUM SALTS AS HARDENERS FOR GELATIN
Donald M. Burness, Irondequoit, and Burton D. Wilson, Greece, N.Y., assignors to Eastman Kodak Company, Rochester, N.Y., a corporation of New Jersey
No Drawing. Filed Nov. 3, 1965, Ser. No. 506,276
12 Claims. (Cl. 96—111)

This application is a continuation-in-part of application Ser. No. 248,201, filed Dec. 31, 1962, now abandoned.

This invention relates to gelatin coating compositions capable of forming layers resistant to the effects of swelling by aqueous solutions, which compositions contain certain isoxazolium salts.

In the use of gelatin for layers for photographic products it is desirable to incorporate therein agents which will increase the resistance of the gelatin to swelling by aqueous solutions. Various materials have been suggested some of which have appeared to be quite useful while other compounds which have hardening properties for gelatin have adversely affected certain photosensitive products or have been otherwise unsuitable.

One object of our invention is to provide gelatin compositions from which layers may be prepared having good resistance to the swelling effects of aqueous solutions. Another object of our invention is to provide certain isoxazolium salts which have a good hardening effect on gelatin. A further object of our invention is to provide hardeners for gelatin which also show strong antifoggant activity. Other objects of our invention will appear herein.

We have found that isoxazolium salts unsubstituted in the 3-position of the isoxazole ring having the following general structure are useful as hardeners when incorporated in gelatin compositions:

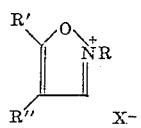

in which R is an aliphatic hydrocarbon group of 1 to 4 carbon atoms either with or without a sulfonate anion thereon, R' and R'' are each one of the following: hydrogen, unsubstituted alkyl, unsubstituted aryl, alkyl or aryl substituted with halogen, hydroxyl, alkyl, alkoxy and/or sulfonate anion, a simple heterocyclic ring such as furyl or R' and R'' together form an alicyclic ring and X is an anion which contributes to the water solubility of the compound such as perchlorate, paratoluene-sulfonate or the like, unless sulfonate anion is already present, attached to R, R' or R''.

These compounds when incorporated in gelatin compositions in any proportion show a hardening effect on the gelatin although as ordinarily employed they are provided in an amount of 1 up to 5% based on the weight of the gelatin. The hardeners may be incorporated in gelatin coating compositions and are especially useful in gelatin silver halide photographic emulsions. We have found that these hardeners are especially useful in that they also exhibit strong antifoggant activity. The following table shows the values representative of R, R', R'' and X in the above formula of the hardeners used in the examples:

| Ex. | R | R' | R'' | X |
|---|---|---|---|---|
| 1 | $C_2H_5$ | $\underset{SO_3^-}{\bigcirc}$ | H | |
| 2 | $CH_3$ | H | H | $C_7H_7SO_3$ |
| 3 | $-(CH_2)_3SO_3^-$ | H | H | |
| 4 | $CH_3$ | $CH_2$ (contains 37% 2,3-iosmer) | H | $C_7H_7SO_3$ |
| 5 | $CH_3$ | $C_6H_5$ | H | $ClO_4$ |
| 6 | $CH_3$ | H | $-(CH_2)_3OH$ | $C_7H_7SO_3$ |
| 7 | $CH_3$ | $CH_3$ | H | $C_7H_7SO_3$ |
| 8 | $CH_3$ | $(CH_3)_2CH-$ | H | $ClO_4$ |
| 9 | $CH_3$ | H | $CH_3$ | $C_7H_7SO_3$ |
| 10 | $-(CH_2)_3SO_3^-$ | $CH_3$ | H | |

These products were used in various proportions in the compositions referred to and good hardening was obtained. In some cases such as Examples 1 and 3, the anion is not designated since it forms a part of one of the substituent R groups; the compounds are thus zwitterions.

Samples of the compounds listed were added to separate portions of a high speed gelatin-silver bromoiodide emulsion. Each emulsion sample was coated on cellulose acetate film support having a silver coverage of 432 mg. per square foot and a gelatin coverage of 980 mg. per square foot. The product was exposed on an Eastman Ib sensitometer and was processed for 5 minutes in a standard photographic developer, fixed, washed and dried and was compared with similar products having emulsion coatings to which no hardener had been added. The resulting layers were resistant to effects of water and aqueous solutions whereas the control layers containing no hardener were readily swellable in the aqueous solutions used in the processing operations.

The following examples are illustrative of the invention:

Example 1

2-ethyl-5-phenylisoxazolium-3'-sulfonate was incorporated in samples of a gelatin-silver halide emulsion in proportions of 3 parts and 6 parts respectively per 100 parts of gelatin. The emulsion samples were coated onto cellulose acetate film support at a silver coverage of 432 mg. per square foot and a gelatin coverage of 980 mg. per square foot. The various coated samples were exposed on an Eastman Ib sensitometer, processed for 5 minutes in Kodak DK-50 developer, fixed, washed and dried. Strips were immersed at 80° F. in water and the vertical percent of swell was determined. The percent vertical swell was 339 and 265 in the respective samples as compared with a percent vertical swell of 817 using a gelatin layer in which no hardener had been incorporated.

Example 2.—2-methylisoxazolium p-toluenesulfonate

This material was prepared using isoxazole as the starting material. The isoxazole was prepared by mixing 1,1,3,3-tetraethoxypropane with an equivalent amount of hydroxylamine hydrochloride in aqueous solution and distilling off the alcohol-isoxazole azeotrope which results. This solution was used directly for the next step, as described in the following paragraph after removal of water by a drying agent. The isoxazole used for Example 3 was separated from the alcohol by precipitation with an excess of saturated cadmium chloride solution whereupon isoxazole was separated from the dried complex by steam distillation and isolated by ether extraction followed by drying and distillation.

An alcohol solution of isoxazole, the preparation of which is described in the preceding paragraph was treated with an excess of methyl p-toluenesulfonate overnight at 50° C. The volatiles were removed under vacuum and the residue was diluted with ether causing phase separation, the oil layer crystallizing on cooling. The crude product was recrystallized by dissolving in acetone, adding ether to the point of cloudiness and then cooling resulting in crystallization of the product. The product had a melting point of 105–109° C. and analyzed, C=52.1; H=4.9; N=5.3; S=12.4 as against calculated values for $C_{11}H_{13}NO_4S$ of 51.75, 5.13, 5.49 and 12.56 respectively. The resulting product was incorporated in gelatin coating compositions in various proportions and was found to measurably decrease the degree of swell of those coatings when strips of coatings thereof on film base were immersed at 68° F. in distilled water and were compared with similar products prepared from gelatin compositions without hardener therein.

*Example 3.—3-(2-isoxazolium)propanesulfonate*

A solution of isoxazole in a large excess of 1,3-propanesultone was heated overnight at 45° and then overnight at 75°. The viscous mixture obtained was diluted with benzene which removed much of the propanesultone. A viscous, yellow oil remained. This was purified by repeated solution in methanol, followed by precipitation in benzene. The resulting product 3-(2-isoxazolium)propanesulfonate was used as a hardener in gelatin compositions in various proportions and was found to greatly increase the resistance of the coatings prepared therefrom to swelling by aqueous liquids as compared with gelatin coatings without hardener.

*Example 4.—2,5-dimethylisoxazolium p-toluenesulfonate*

An acetonitrile solution of a mixture of 3 and 5-methylisoxazole (37 and 63 percent, respectively) was treated with methyl p-toluenesulfonate and the product was isolated in the same manner as described in Example 2. The yield of product of 87–94° C. melting point was 12%. It appeared that the purified product contained 37% of the 2,3-isomer. The product analyzed C, 53.5; H, 5.7; N, 5.0; S, 11.6 as against calculated values of $C_{12}H_{15}NO_4S$ of 53.52, 5.61, 5.20 and 11.91 respectively. The resulting product was employed as a hardener in gelatin coating compositions and the coatings resulting therefrom exhibited good resistance to the effect of swelling by aqueous liquids.

The methylisoxazole mixture employed as the starting material here was prepared similarly to isoxazole in Example 2 but using 4,4-dimethoxy-2-butanone as the starting material. Only a small portion of the methylisoxazole azeotroped out with the methanol. The aqueous solution remaining was cooled, neutralized with sodium carbonate and steam distilled until the distillate had only one phase. The distillate was saturated with sodium chloride, the phases separated and the aqueous layer extracted with ether. The combined extracts were dried and fractionally distilled giving only partial separation of the isomers. The fraction used as the methylisoxazole mixture had a boiling point of 119.5–120° C.

*Example 5.—2-methyl-5-phenylisoxazolium perchlorate*

An acetonitrile solution of 5-phenylisoxazole was treated as in Example 2. Conversion was only 15%. The unquaternized material was heated for 3 days at 75° with excess dimethyl sulfate. The combined quaternary materials were converted to the perchlorate and recrystallized from water. The product of 180–181° C. melting point was obtained in 85% yield. It analyzed C, 46.3; H, 3.7; N, 5.1; Cl, 13.9 as against calculated values for $C_{10}H_{10}ClNO_5$ of 46.26, 3.88, 5.39 and 13.66 respectively. The resulting product when incorporated as a hardener into a gelatin coating composition gave layers which exhibit good resistance to the swelling effect of aqueous liquids.

The 5-phenylisoxazole used had been prepared from 3-(dimethylamino)acrylophenone by refluxing 1 hour with a 10% excess of hydroxylamine hydrochloride. The oil which had separated formed crystals which were filtered off, dissolved in benzene, dried and distilled (B.P. 60–84°/0.07–0.09 mm.) followed by recrystallization from petroleum ether (at −80°). M.P. 21–22° C.

*Example 6.—4-(3-hydroxypropyl)-2-methylisoxazolium p-toluenesulfonate*

An acetonitrile solution of 4-(3-hydroxypropyl)isoxazole was treated as in Example 2. The resulting viscous, pale yellow oil was purified as in Example 3, but using acetone and ether. This product analyzed C, 53.3; H, 6.5; N, 4.2; S, 10.6 as against calculated values for $C_{14}H_{19}NO_5S$ of 53.66, 6.11, 4.47 and 10.23 respectively. The product was employed as a hardener in gelatin coating compositions which gave coatings having good resistance to the swelling effect of aqueous liquids.

The 4-(3-hydroxypropyl)isoxazole used had been prepared by slowly distilling a mixture of 0.5 mole of 3-(diethoxymethyl) - 2 - ethoxytetrahydropyran (U.S. Patent 2,517,543), 100 ml. of water and 1 ml. of acetic acid. When about 70 ml. of distillate had been collected, 50 ml. of water and 1 ml. of acetic acid were added and distillation was continued until the distillate temperature reached 90° C. at which point 105 ml. had been collected. After cooling, 35 grams of hydroxylamine hydrochloride were added and the mixture was heated on a steam bath. The solution was cooled, raised to a pH of 7.5 with NaOH and extracted with methylene chloride. Distillation gave 4-(3 - hydroxypropyl)isoxazole, B.P. 78–82°/0.03–0.05 mm. in 79% yield.

*Example 7.—2,5-dimethylisoxazolium p-toluenesulfonate*

5-methylisoxazole was treated with excess methyl p-toluenesulfonate in acetonitrile solution at 40–50° for two weeks and then worked up as in Example 2. The crude product (97% yield) was recrystallized from acetone-ether. The refined product (M.P. 111–112°) analyzed C, 53.8; H, 5.7; N, 4.9; S, 11.8 as against calculated values for $C_{12}H_{15}NO_4S$ of C, 53.52; H, 5.61; N, 5.20; S, 11.91. The resulting material was used as a hardener in gelatin coating compositions from which layers having good resistance to the swelling effects of aqueous liquids were obtained.

The 5-methylisoxazole used had been prepared from 4,4-dimethoxy-2-butanone by mixing with an excess of dry piperidine and a small amount of p-toluenesulfonic acid and heating while carefully distilling off the methanol formed. Distillation of the residue gave 4-piperidino-3-butene-2-one (B.P. 87–90°/0.08 mm.) in 60% yield. This material was then mixed with 10% excess of aqueous hydroxylamine hydrochloride with cooling and the mixture was then heated on the steam bath for 2 hours. The cooled mixture was adjusted to a pH of 7.2 and extracted with dichloromethane. The dried and concentrated extract was distilled, giving 5-methylisoxazole in 81% yield (B.P. 121–123°/752 mm.).

*Example 8.—5-isopropyl-2-methylisoxazolium perchlorate*

A mixture of 5-isopropylisoxazole and excess dimethyl sulfate was kept at 40° C. for 1 week and was then worked up by the procedure described in Example 2. The crude material was converted to the perchlorate (98% yield) which was then recrystallized from water. The refined 5-isopropyl-2-methylisoxazolium perchlorate obtained had a M.P. 119–121°. This material when incorporated in gelatin compositions was found to improve the resistance of layers prepared therefrom to the swelling action of water.

*Example 9.—2,4-dimethylisoxazolium p-toluenesulfonate*

This compound was prepared as described in Example 7 except that 4-methylisoxazole was substituted for 5-methylisoxazole. The crude product (88% yield) was recrystallized from acetone. The product had a M.P. of 86–88°. Resistance to swelling by water of layers prepared from gelatin compositions containing the 2,4-dimethylisoxazolium p-toluenesulfonate was improved thereby.

The 4-methylisoxazole employed as the starting material was prepared as follows: 3-ethoxypropene was isomerized to 1-ethoxypropene [Price and Snyder, JACS, 83, 1771 (1961)], which in turn was converted to 2-methyl-1,1,3,3-tetraethoxypropane by the procedure of Zeller et al. [Helv. Chim. Acta. 42, 844 (1959)]. This acetal was then converted to 4-methylisoxazole as in the preparation of isoxazole in Example 2 (B.P. 126.5–127°/743 mm.).

*Example 10.—3-[2-(5-methylisoxazolium)]propane-sulfonate*

This compound was prepared in the manner described in Example 3 but as the starting material 5-methylisoxazole, the preparation of which is described in Example 7, was used. The infrared spectrum of the product resembled that of the product of Example 3. This material 3-[2-(5-methylisoxazolium)]propanesulfonate was incorporated as a hardener in a gelatin composition and greatly increased the resistance of the gelatin to swelling by aqueous liquids.

It is to be understood that the hardeners in accordance with our invention are useful in photographic emulsions in which various ingredients are present. For instance, this might include sensitizers, antifoggants, solvents, colloidal materials, couplers, etc. For instance, the vehicle for the silver halide in a photographic emulsion may be a mixture of gelatin and a water soluble synthetic polymer or a polymeric latex particularly a synthetic polymer having carboxyl groups therein such as ethyl acrylate-acrylic acid copolymer, butyl acrylate-acrylic acid copolymer, lactone of vinyl acetate-maleic anhydride interpolymer and the like. The use of polymers of this type in photographic emulsions is described and claimed in application Ser. No. 139,313 of Houck et al. Here the isoxazolium hardener may be incorporated in the photographic emulsion or it may be applied as an aqueous overcoat over the gelatin-synthetic polymer coating. The hardeners in accordance with our invention can also be used in gelatin containing photographic emulsions in which coupler is present which coupler may if desired be provided to the emulsion in the form of its solution or it may be supplied directly to the emulsion composition.

The following example is illustrative of the use of hardeners in accordance with the invention in emulsions containing a vehicle of a mixture of synthetic polymer and gelatin:

*Example 11*

To a silver halide emulsion in which the vehicle was a mixture of 3 parts of a synthetic polymer (80% ethyl acrylate-20% acrylic acid copolymer) and 1 part of gelatin was added as the hardener 2-ethyl-5-phenylisoxazolium-3'-sulfonate in one case, 2,5-dimethylisoxazolium p-toluenesulfonate in another case, and N-methyl-5-phenylisoxazolium perchlorate in still a third case. The hardener was incorporated in each emulsion at the rate of 5 parts of hardener per 100 parts of vehicle. Each of these emulsion samples were coated onto cellulose acetate film support at a coverage of 750 mg. of vehicle per square foot. The vertical swell of the emulsion layers were compared with that of a similar emulsion layer having no hardener therein after each sample had been processed in developer, fixer and given a thorough washing. It was found that the emulsion layers showed much more resistance to water indicated by swell characteristics than that of the layers containing no hardener. The hardener in each case was used by applying its solution in the form of an aqueous overcoat over the photographic emulsion layer.

In all of the gelatin-silver halide photographic emulsion coatings in which the hardeners of our invention had been incorporated, an antifoggant effect was observed.

The invention has been described in considerable detail with particular reference to certain preferred embodiments thereof, but it will be understood that variations and modifications can be effected within the spirit and scope of the invention as described hereinabove, and as defined in the appended claims.

We claim:

1. A composition comprising gelatin containing therein in hardening amount a compound having the formula

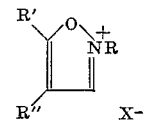

in which R is selected from the group consisting of aliphatic hydrocarbon groups of 1–4 carbon atoms and aliphatic hydrocarbon groups of 1–4 carbon atoms containing a sulfonate anion thereon, R' and R" are selected from the group of hydrogen, unsubstituted alkyl, unsubstituted aryl, alkyl and aryl substituted with halogen, hydroxyl, alkyl, alkoxy and/or sulfonate anion, simple heterocyclic rings and those groups in which R' and R" together form an alicyclic ring and X⁻ is an anion when sulfonate anion does not constitute a part of R, R' or R".

2. A composition in accordance with claim 1 in which ethyl phenylisoxazolium sulfonate is a hardener.

3. A composition in accordance with claim 1 in which methylisoxazolium para-toluenesulfonate is a hardener.

4. A composition in accordance with claim 1 in which isoxazolium propane sulfonate is a hardener.

5. A composition in accordance with claim 1 is which dimethylisoxazolium para-toluenesulfonate is a hardener.

6. A composition in accordance with claim 1 in which hydroxylpropyl methylisoxazolium para-toluenesulfonate is a hardener.

7. A composition in accordance with claim 1 in which isopropyl methylisoxazolium perchlorate is a hardener.

8. A composition in accordance with claim 1 in which the gelatin composition is a gelatin-silver halide emulsion and the hardener therein is ethyl phenylisoxazolium sulfonate.

9. A composition in accordance with claim 1 in which the gelatin composition is a gelatin-silver halide photographic emulsion and the hardener is methylisoxazolium para-toluenesulfonate.

10. A composition in accordance with claim 1 wherein the gelatin composition containing the hardener is a gelatin-silver halide photographic emulsion.

11. A composition comprising gelatin containing a synthetic polymer having carboxyl groups therein and in hardening amount a compound having the formula:

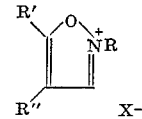

in which R is selected from the group consisting of aliphatic hydrocarbon groups of 1–4 carbon atoms and aliphatic hydrocarbon groups of 1–4 carbon atoms containing a sulfonate anion thereon, R' and R" are selected from the group of hydrogen, unsubstituted alkyl, unsubstituted aryl, alkyl and aryl substituted with halogen, hydroxyl, alkyl, alkoxy, and/or sulfonate anion, simple heterocyclic rings and those groups in which R' and R" together form an alicyclic ring and $X^-$ is an anion when sulfonate anion does not constitute a part of R, R' or R".

12. A composition in accordance with claim 11 in which the composition is a photographic emulsion composed of silver halide in a vehicle comprising gelatin and an alkyl acrylate-acrylic acid copolymer.

No references cited.

NORMAN G. TORCHIN, *Primary Examiner.*

J. RAUBITSCHEK, *Assistant Examiner.*